US012753876B2

(12) United States Patent
Ochoa Ochoa et al.

(10) Patent No.: US 12,753,876 B2
(45) Date of Patent: Oct. 6, 2026

(54) MODULAR MOUNTING ASSEMBLY COMPRISING VARIABLE CHANNEL VOLUME SYSTEM

(71) Applicant: Dotworkz, Santee, CA (US)

(72) Inventors: Manuel D. Ochoa Ochoa, San Diego, CA (US); Roberto S. Medina, Ontario, CA (US); William Arbuckle, Paso Robles, CA (US); William Ferris, La Mesa, CA (US); Jacob Rorie, San Diego, CA (US)

(73) Assignee: Dotworkz, Santee, CA (US)

( * ) Notice: Subject to any disclaimer, the term of this patent is extended or adjusted under 35 U.S.C. 154(b) by 66 days.

(21) Appl. No.: 18/892,980

(22) Filed: Sep. 23, 2024

(65) Prior Publication Data

US 2026/0085784 A1 Mar. 26, 2026

(51) Int. Cl.
*F16M 13/02* (2006.01)
*F16B 2/12* (2006.01)
*G03B 17/56* (2021.01)

(52) U.S. Cl.
CPC ............. *F16M 13/022* (2013.01); *F16B 2/12* (2013.01); *G03B 17/561* (2013.01)

(58) Field of Classification Search
CPC ...... F16M 13/02; F16M 13/022; F16M 13/00; F16B 2/12; Y10T 24/44974
USPC ..... 248/231.41, 228.3, 229.22, 274.1, 276.1, 248/286.1, 220.1
See application file for complete search history.

(56) References Cited

U.S. PATENT DOCUMENTS 1,702,937 A * 2/1929 Friedemann .............. A47F 3/12 248/242
3,747,540 A * 7/1973 Salkoff .................. A47B 57/26 248/245
5,069,411 A * 12/1991 Murphy ................. A47G 1/164 248/287.1
5,170,977 A * 12/1992 McMillan ............. E04B 1/2608 52/712
5,368,267 A * 11/1994 Howard ................. A47G 7/044 248/274.1
6,015,123 A * 1/2000 Perez ................... F16M 13/025 248/220.21
6,370,741 B1 * 4/2002 Lu ........................ A47B 21/045 24/523
(Continued)

*Primary Examiner* — Terrell L McKinnon
*Assistant Examiner* — Michael McDuffie
(74) *Attorney, Agent, or Firm* — W. Eric Boyd, Esq.

(57) ABSTRACT

A modular mounting assembly comprising a variable channel volume system for mounting a surveillance camera housing on a linear or corner portion of a structure such as a parapet. A pair of first bracket arms extending from a first subassembly are slidably received by a pair of opposing second bracket arms extending from a second subassembly and secured to define a rigid assembly. The first subassembly includes a forward-facing mounting plate upon which to mount a camera housing. The first subassembly and second subassembly are adjustable with respect to each other along the longitudinal axis of the assembly to permit the assembly to clamp and be temporarily secured over the surface of a wall or parapet. Compression means and standoff elements are provided and configured to define a channel volume for the parapet coping or flange portion to pass through when the assembly is secured on the parapet.

10 Claims, 6 Drawing Sheets

(56) References Cited

U.S. PATENT DOCUMENTS

| | | | | | |
|---|---|---|---|---|---|
| 6,494,642 | B1 * | 12/2002 | Daly | E01C 11/227 | 405/36 |
| 6,837,338 | B2 * | 1/2005 | Grover | E06C 7/48 | 182/214 |
| 8,312,966 | B1 * | 11/2012 | Guthrie | E04G 5/045 | 182/36 |
| 8,505,862 | B2 * | 8/2013 | MacKay | B63B 17/00 | 248/225.11 |
| 8,985,540 | B1 * | 3/2015 | Slesinski | B33Y 80/00 | 248/316.4 |
| 9,075,290 | B1 * | 7/2015 | Thieman | F16M 13/022 | |
| 9,383,087 | B2 * | 7/2016 | Rashidi Doust | F21V 29/70 | |
| 10,652,439 | B2 * | 5/2020 | Waller | G03B 17/561 | |
| 11,739,921 | B2 * | 8/2023 | Elmvang | F21S 8/02 | 362/388 |
| 2005/0258321 | A1 * | 11/2005 | Worrall | F16M 13/027 | 248/201 |
| 2007/0284492 | A1 * | 12/2007 | Oh | F16M 13/025 | 248/220.1 |
| 2009/0101780 | A1 * | 4/2009 | Revelino | F16M 11/18 | 248/274.1 |
| 2016/0154295 | A1 * | 6/2016 | Chang | F16B 7/1472 | 248/274.1 |
| 2023/0235849 | A1 * | 7/2023 | Chen | F16M 13/022 | 248/274.1 |

* cited by examiner

MODULAR MOUNTING ASSEMBLY COMPRISING VARIABLE CHANNEL VOLUME SYSTEM

CROSS-REFERENCE TO RELATED APPLICATIONS

N/A

STATEMENT REGARDING FEDERALLY SPONSORED RESEARCH AND DEVELOPMENT

N/A

BACKGROUND OF THE INVENTION

Field of the Invention

The invention relates generally to the field of mechanical mounting systems for removably securing a user-selected device or item such as a surveillance camera and housing to a structure.

More specifically, the invention relates to a modular mounting assembly that permits a user to mechanically and removably secure a device such as a surveillance camera housing to a building parapet, wall or similar upwardly depending structure without risk of damage or penetration to the surfaces of the structure.

Description of the Related Art

Video surveillance systems and imaging and recording camera devices are commonplace and found in numerous everyday settings and in particular, security applications for monitoring interior and exterior areas of commercial, military, governmental and residential premises.

Such surveillance systems may be configured for live feed viewing by an operator, or for scene recording or remote viewing after an event occurs by means of transmitting the recorded video data to an off-site operator.

The above video and still-image camera devices are typically mounted in protective housings or enclosures that securely protect the camera system from environmental factors and are mounted in locations to permit a wide and unobstructed field of view of the site to be surveilled.

Often, the optimal location for one or more surveillance cameras and/or related housings is at an elevated position on a building, wall or structure above the site that is the subject of surveillance. Such an elevated location generally affords an optimal view of the scene of interest and also places the camera hardware at a location that is not easily accessible to unauthorized personnel.

Because of the rugged nature of commercial grade surveillance cameras and housings, the size and weight of the combined system can be significant, requiring sturdy and heavy-duty mounting systems to securely position and affix the camera system on a building or wall. This in turn often requires one or more penetrations into the wall, roof or parapet of a building such as by drilling, screwing or nailing which can detrimentally allow moisture such as rainwater to penetrate and damage the building structure.

Aside from the obvious downside of damage caused by permanently installing mechanical fasteners into the building structure itself, there may be unnecessary associated labor costs and time consumed that are not justified in cases involving temporary surveillance camera installations such as a rally, music event or public gathering.

To address the above deficiencies in the prior art approaches, what is needed is a camera housing mounting system that is rugged and sturdy when mounted on a wall or building parapet, and that is quickly and easily installed or removed from a structure without damaging the surface of the structure itself.

BRIEF SUMMARY OF THE INVENTION

In a first aspect of the invention, a modular mounting assembly comprising a variable channel volume system is disclosed for mounting on a linear portion of a structure such as a wall or parapet. The assembly may comprise a first subassembly comprising a first mounting plate, a pair of inwardly depending and opposing standoff elements and a pair of inwardly depending and opposing first bracket arms. A second subassembly is provided comprising a second mounting plate, a pair of inwardly depending and opposing second bracket arms and adjustable compression means.

The first bracket arms are configured to be adjustably received by and along the length of the respective second bracket arms whereby a distance between the first mounting plate and second mounting plate may be varied along the longitudinal axis of the modular mounting assembly. Locking means is disclosed to permit the selective urging or compression of the first bracket arms against the respective second bracket arms to define a substantially rigid connection between the first subassembly and the second subassembly. The standoff elements and inwardly depending compression means are configured to create a sturdy user-defined channel volume as a lateral and vertical offset distance of the first and second bracket arms, first mounting plate and second mounting plate from a structure surface.

In a second aspect of the invention, a modular mounting system is disclosed for mounting on a corner of a wall or parapet. The assembly may comprise a first subassembly comprising a first mounting plate, a pair of inwardly depending and opposing angled standoff elements and a pair of inwardly depending and opposing first bracket arms. The angled standoff elements comprise respective angled standoff surfaces. A second subassembly is provided comprising a second mounting plate, a pair of inwardly depending and opposing second bracket arms and a pair of opposing interior corner attachments. The interior corner attachments each may comprise a respective interior corner attachment face and an adjustable inwardly depending compression means. The first bracket arms are configured to be adjustably received by and along the length of the respective second bracket arms whereby a distance between the first mounting plate and second mounting plate may be varied along the longitudinal axis of the modular mounting assembly.

Locking means is provided to permit the selective urging or compression of the first bracket arms against the respective second bracket arms to define a substantially rigid connection between the first subassembly and the second subassembly. The angled standoff elements and compression means are configured to define a sturdy user-defined channel volume as a lateral and vertical offset distance of the modular mounting assembly from a structure surface.

In a third aspect of the invention, at least one of the respective pairs of first bracket arms and second bracket arms comprises a user-defined length.

In a fourth aspect of the invention, the inwardly depending angle of at least one of the respective pairs of first bracket arms and second bracket arms is disposed at a user-defined angle with respect to the respective first mounting plate or second mounting plate.

In a fifth aspect of the invention, at least one of the respective pairs of first bracket arms and second bracket arms is rotatable about a user-defined axis.

In a sixth aspect of the invention, at least one of the respective angled standoff elements comprises a user-defined geometry.

In a seventh aspect of the invention, at least one of the compression means is a swivel leveling mount element.

These and various additional aspects, embodiments and advantages of the present invention will become apparent to those of ordinary skill in the art upon review of the Detailed Description and the claims that follow.

While the claimed apparatus and method herein has or will be described for the sake of grammatical fluidity with functional explanations, it is to be understood that the claims, unless expressly formulated under 35 USC 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 USC 112, are to be accorded full statutory equivalents under 35 USC 112.

The invention and its various embodiments can now be better understood by turning to the following description of the preferred embodiments which are presented as illustrated examples of the invention in any subsequent claims in any application claiming priority to this application. It is expressly understood that the invention as defined by such claims may be broader than the illustrated embodiments described below.

DETAILED DESCRIPTION OF THE INVENTION

Applicant discloses a modular mounting assembly for removably securing a surveillance camera housing or mounted item to a wall or parapet of a structure.

Figure 1:
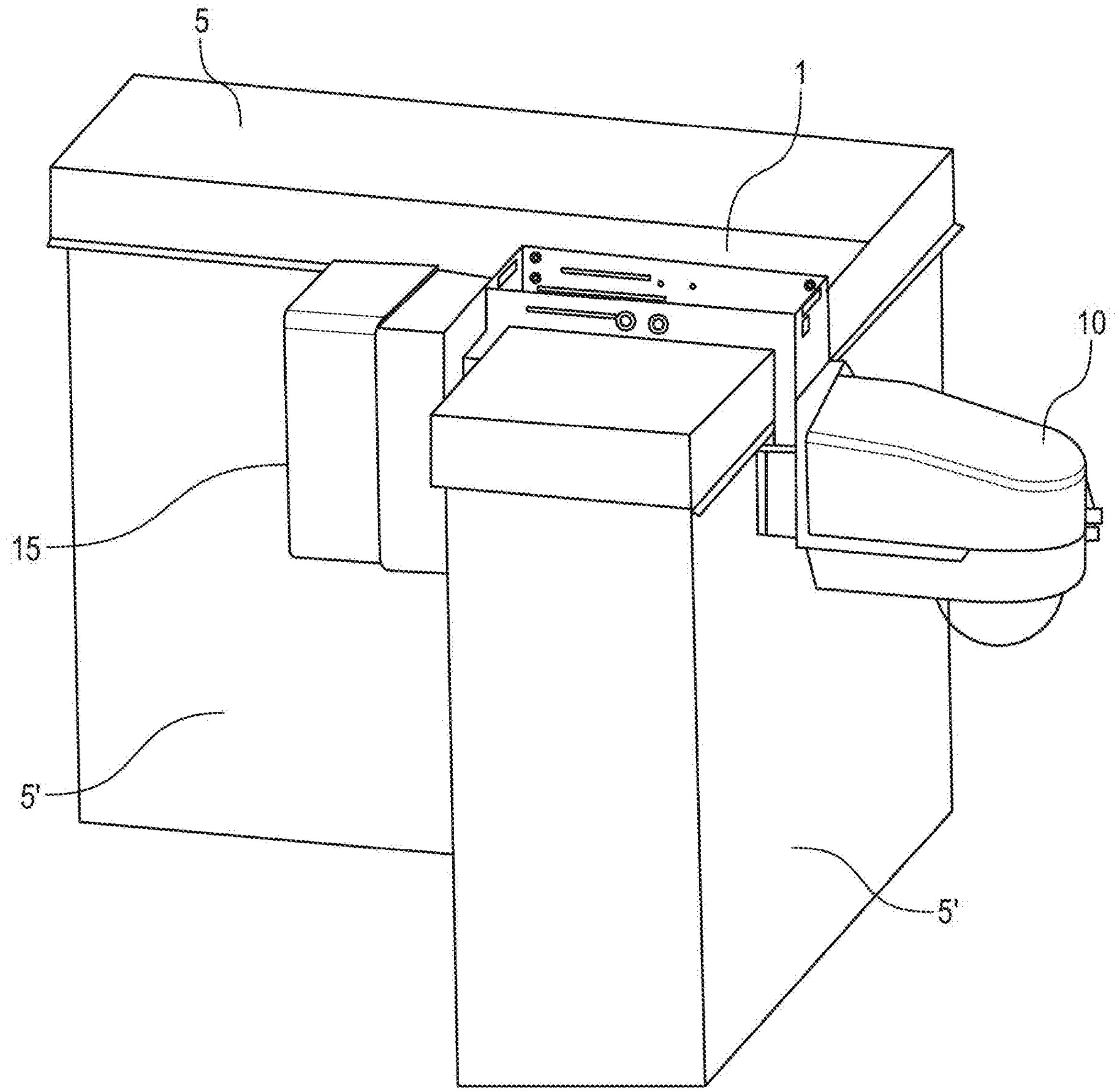
FIG. 1 illustrates the assembly of the invention mounted on a linear portion of a parapet of a building.
Figure 2:
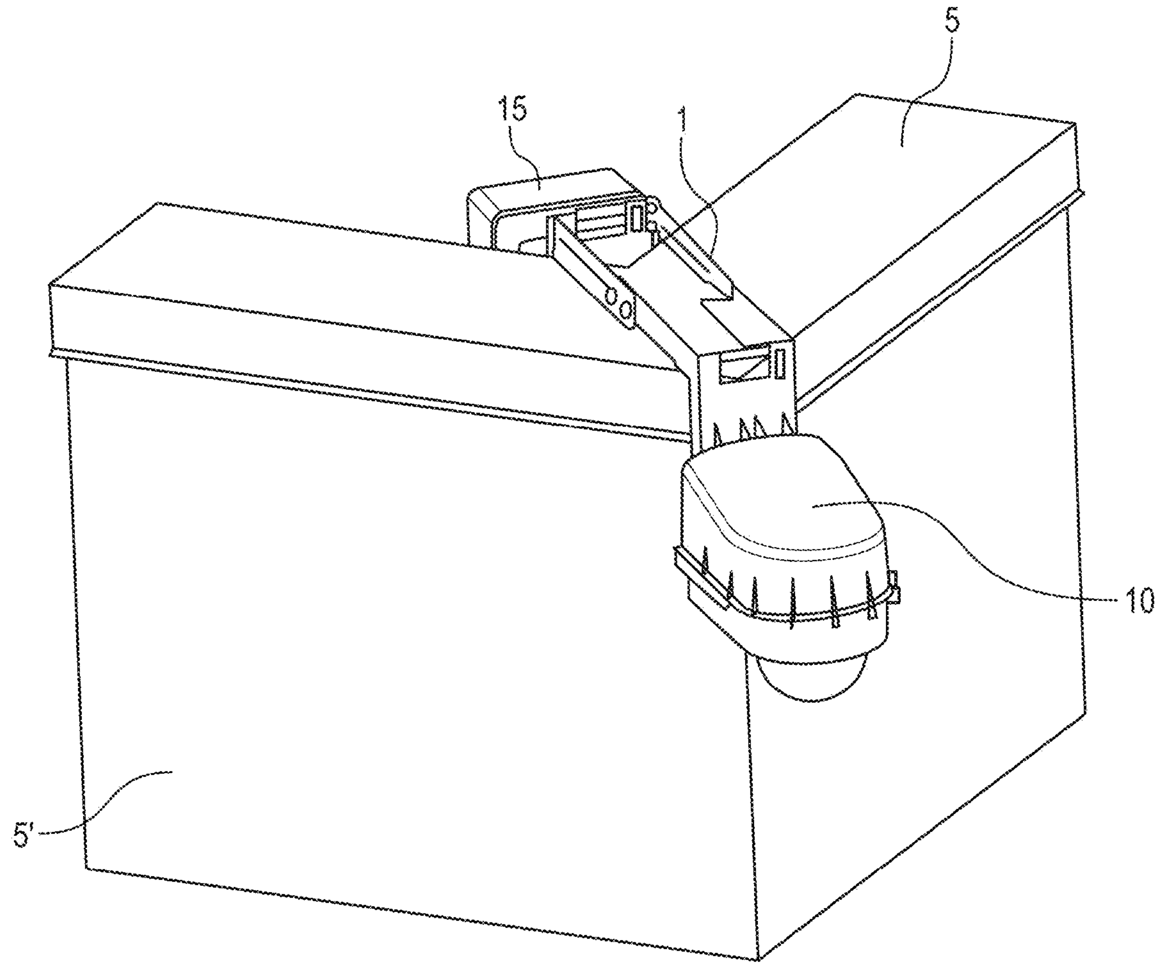
FIG. 2 illustrates the assembly of the invention mounted on a corner portion of a parapet of a building.

Turning to the figures, FIG. 1 and FIG. 2 illustrate alternative embodiments of the assembly 1 of the invention mounted on a wall or parapet 5 having opposing vertical wall surfaces 5'. It is noted that while the illustrated embodiments depict the device of the invention mounted on a upper surface of a vertically depending structure, the device is not limited to such applications and may be installed on an angled or horizontally depending surface of a structure depending upon a user's end requirements Assembly 1 is depicted as having a surveillance camera housing 10 and accessory housing 15 affixed thereto but the invention is suitable for mounting any user-defined element to a parapet or wall such as a sound or public address system, temporarily mounted advertising or promotional items, billboards, motion or heat detection, electrical signage and the like.

FIG. 1 shows a first embodiment of assembly 1 mounted on a linear portion of parapet 5 while FIG. 2 depicts an alternative embodiment of assembly 1 mounted on a corner portion of parapet 5.

Figure 3A:
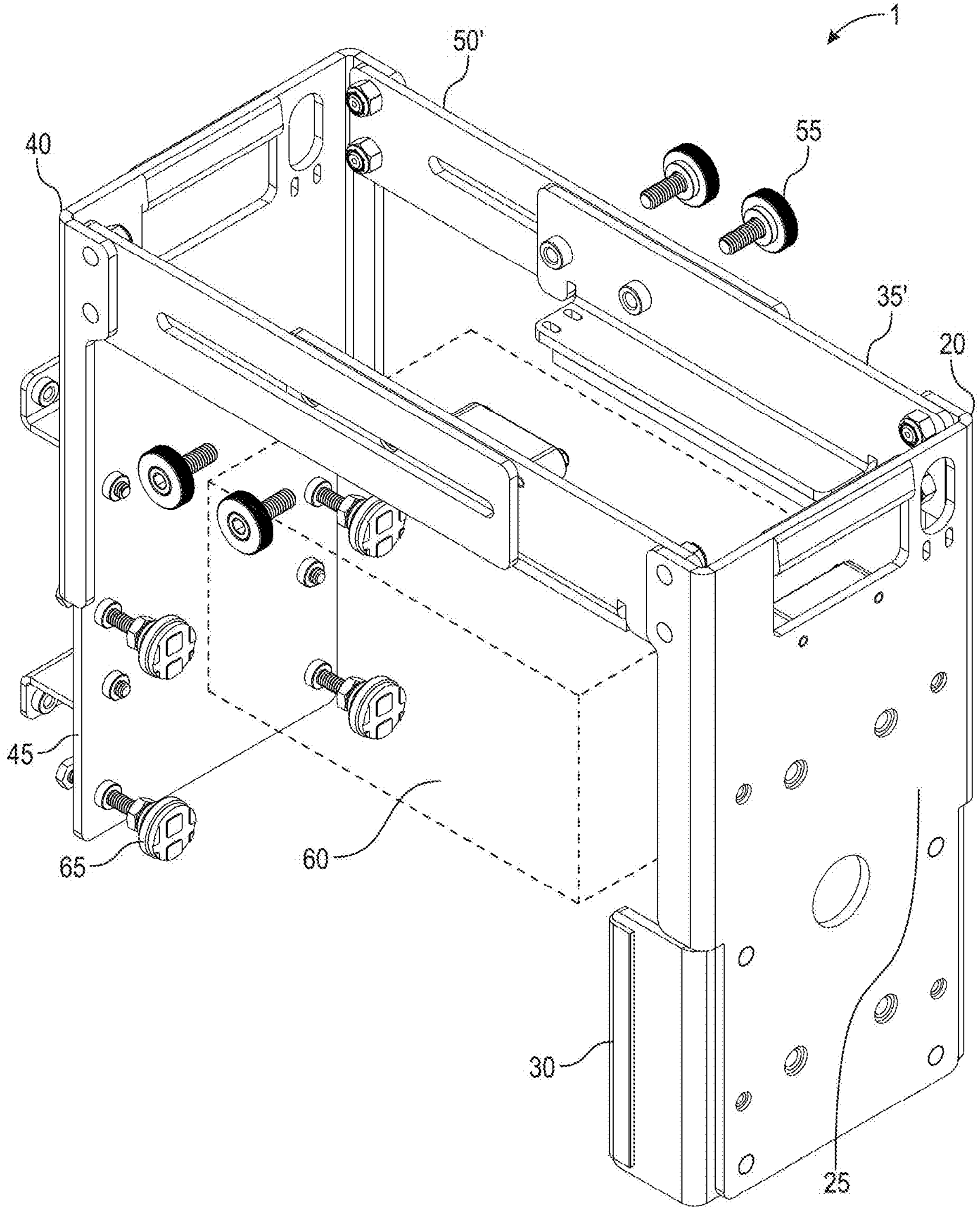
FIG. 3A illustrates the assembly of the invention of FIG. 1 for installation on a linear portion of a parapet of a building and depicting the first bracket arms of the first subassembly received by the second bracket arms of the second subassembly.
Figure 3B:
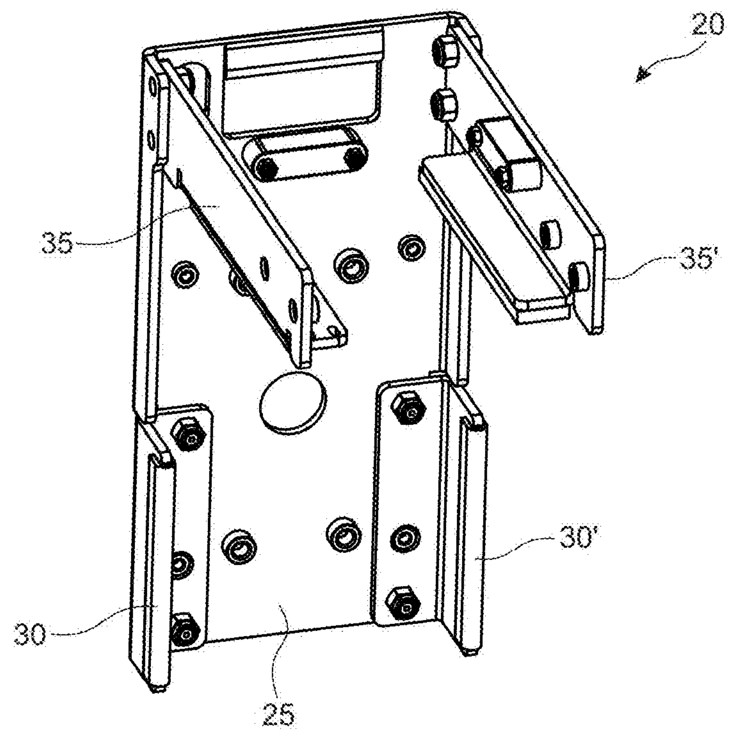
FIG. 3B illustrates the first subassembly of FIG. 3A showing the complementary opposing standoff elements and opposing first bracket arms inwardly depending from the first mounting plate.
Figure 3C:
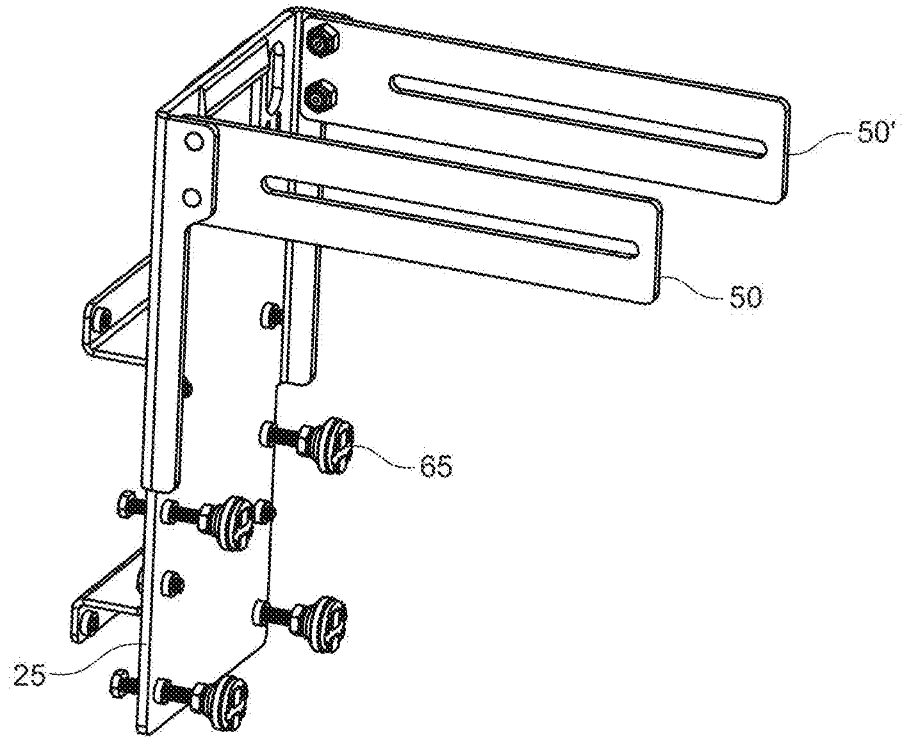
FIG. 3C illustrates the second subassembly of FIG. 3A showing the compression means and opposing second bracket arms inwardly depending from the second mounting plate.

With respect to FIG. 3A, FIG. 3B and FIG. 3C, the embodiment of FIG. 1 comprises a first subassembly 20. First subassembly 20 comprises first mounting plate 25. First mounting plate 25 comprises a pair of inwardly depending and a pair of opposing standoff elements 30 and 30' extending approximately perpendicular to the interior major surface of first subassembly 20.

First subassembly 20 further comprises a pair of inwardly depending and opposing first bracket arms 35 and 35'. First bracket arms 35 and 35' extend approximately perpendicular to the plane defined by the major surface of first mounting plate 25.

In an alternative embodiment of assembly 1, the inwardly projecting angle of first bracket arms 35 and 35' need not be a fixed 90-degree angle relative to first mounting plate 25 and may be configured to be varied or fixed about a user-defined axis with respect to the vertical plane defined by the major surface of first mounting plate 25 by means of a rotatable or repositionable, hinged or adjustable connection to first mounting plate 25.

Assembly 1 further comprises second subassembly 40. Second subassembly 40 comprises a second mounting plate 45 and a pair of inwardly depending and opposing second bracket arms 50 and 50'. Second bracket arms 50 and 50' extend approximately perpendicular to the plane defined by the major surface of second mounting plate 45.

In an alternative embodiment of assembly 1, the inwardly projecting angle of second bracket arms 50 and 50' with respect to second subassembly 40 need not be a fixed 90-degree angle relative to second mounting plate 45 and may be configured to be varied about a user-defined axis with respect to the vertical plane defined by a major surface of second mounting plate 45 by means of a rotatable, hinged or adjustable connection to second mounting plate 45.

First bracket arms 35 and 35' are configured to be adjustably longitudinally received along the length of respective second bracket arms 50 and 50' whereby the distance between the first mounting plate 25 and second mounting plate 45 may be selectively varied along the longitudinal axis of assembly 1.

Assembly 1 further comprises locking means 55 configured to permit a user to selectively urge or compress first bracket arms 35 and 35' against the respective second bracket arms 50 and 50' along their respective lengths to define a substantially rigid connection between first subassembly 20 and second subassembly 40 when clamped over a parapet surface.

Suitable locking means 55 may comprise the illustrated one or more spaced-apart threaded apertures for the receiving of a threaded locking shaft in either or both of first bracket arms 35 and 35' and second bracket arms 50 and 50' whereby the tightening of such shaft compresses first bracket arms 35 and 35' longitudinally along and against the respective lengths second bracket arms 50 and 50'.

Second mounting plate 45 further comprises one or more adjustable compression means 65, which in the illustrated embodiments, are shown as at least one inwardly depending swivel leveling mount. Swivel leveling mounts are a preferred compression means and permit installation of assembly 1 on uneven surfaces 5" though other compression means such as spring clamp mechanisms or adjustable cam locks are suitable so long as they do not damage the surface of a structure.

After first bracket arms 35 and 35' are received by second bracket arms 50 and 50', the loosely assembled first subassembly 20 and second subassembly 40 are mounted over a parapet upper surface and urged inwardly toward each other and the respective opposing wall surfaces 5'. Once positioned, first bracket arms 35 and 35' and second bracket arms 50 and 50' are compressed against each other using locking means 55 to define a rigid assembly 1.

After assembly 1 is secured over the parapet surface, compression means 65 is used to selectively compress and urge second mounting plate 45 toward first mounting plate 25 when mounted and clamped upon parapet 5 to permit a user to generate a clamping force between first subassembly 20 and second subassembly 40 with respect to opposing wall surfaces 5' of parapet 5 by selectively tightening compression means 65.

Standoff elements 30 and 30' and compression means 65 are configured to permit an adjustable offset of the major surface of first mounting plate 25 and major surface of second mounting plate 45 a user-defined distance from wall surface 5 to define a channel volume 60.

A user-defined channel volume 60 size is defined by standoff elements 30 and 30', compression means 65, first bracket arms 35 and 35' and second bracket arms 50 and 50', and is desirable in that it defines a variable-sized contact-free volume or "tunnel" through which a portion of the upper surface of parapet 5 is received without risk of damage by any element of assembly 1.

Because it is common for parapets to have an upper flashing or sheet metal coping that projects outwardly from vertical surfaces 5' as seen in FIG. 1 and FIG. 2, such a channel volume 60 is desirable to avoid physical contact or damage to the parapet flashing or coping.

To accommodate the need to install assembly 1 on parapets and copings having different dimensions, standoff elements 30 and 30', compression means 65, first bracket arms 35 and 35 and second bracket arms 50 and 50' are modular, i.e., each readily interchangeable by a user on the respective first subassembly 20 and second subassembly 40 such as by means of threaded fasteners to enable in a modular, customizable channel volume system wherein each such element and channel volume 60 may be provided with any user-defined configuration, dimension or geometry as is suited for a particular installation.

Figure 4A:
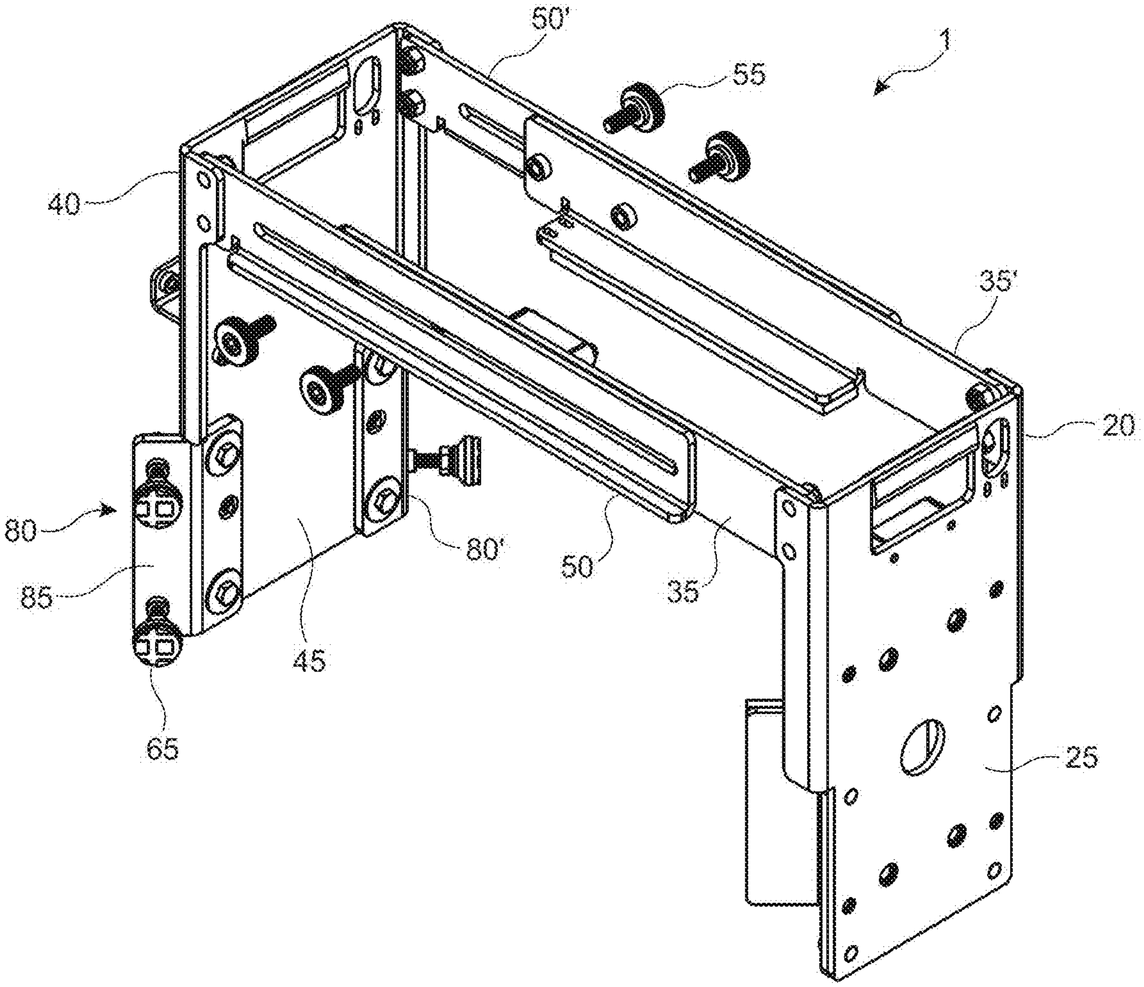
FIG. 4A illustrates the assembly of the invention of FIG. 2 for installation on a corner of a parapet of a building and depicting the first bracket arms of the first subassembly received by the second bracket arms of the second subassembly.
Figure 4B:
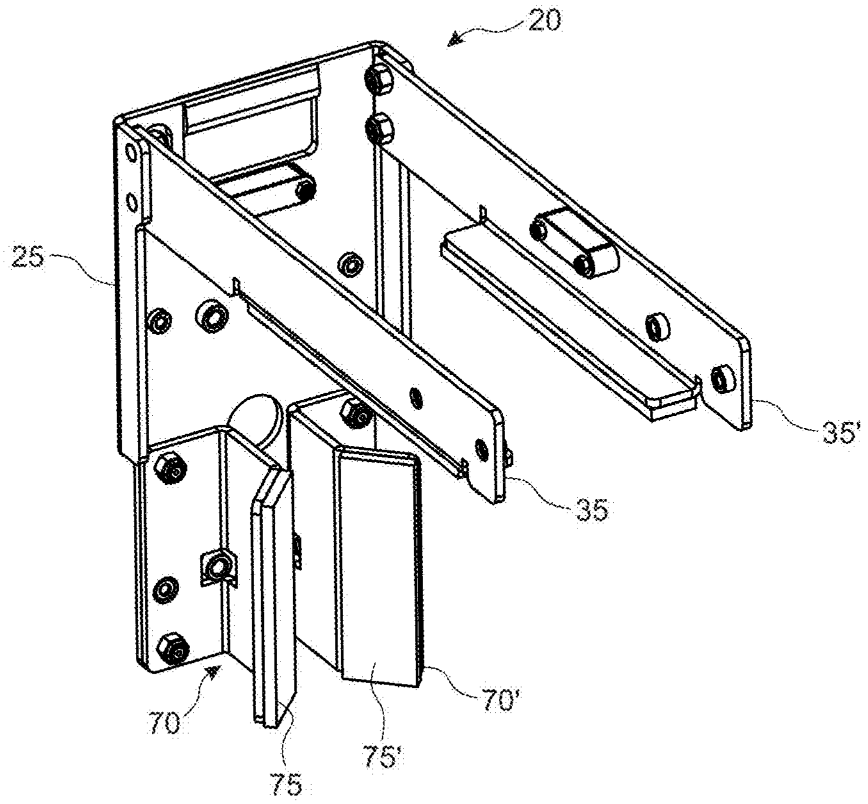
FIG. 4B illustrates the first subassembly of FIG. 4A showing the complementary opposing angled standoff elements each comprising complementary opposing angled standoff surfaces, and opposing first bracket arms inwardly depending from the first mounting plate.
Figure 4C:
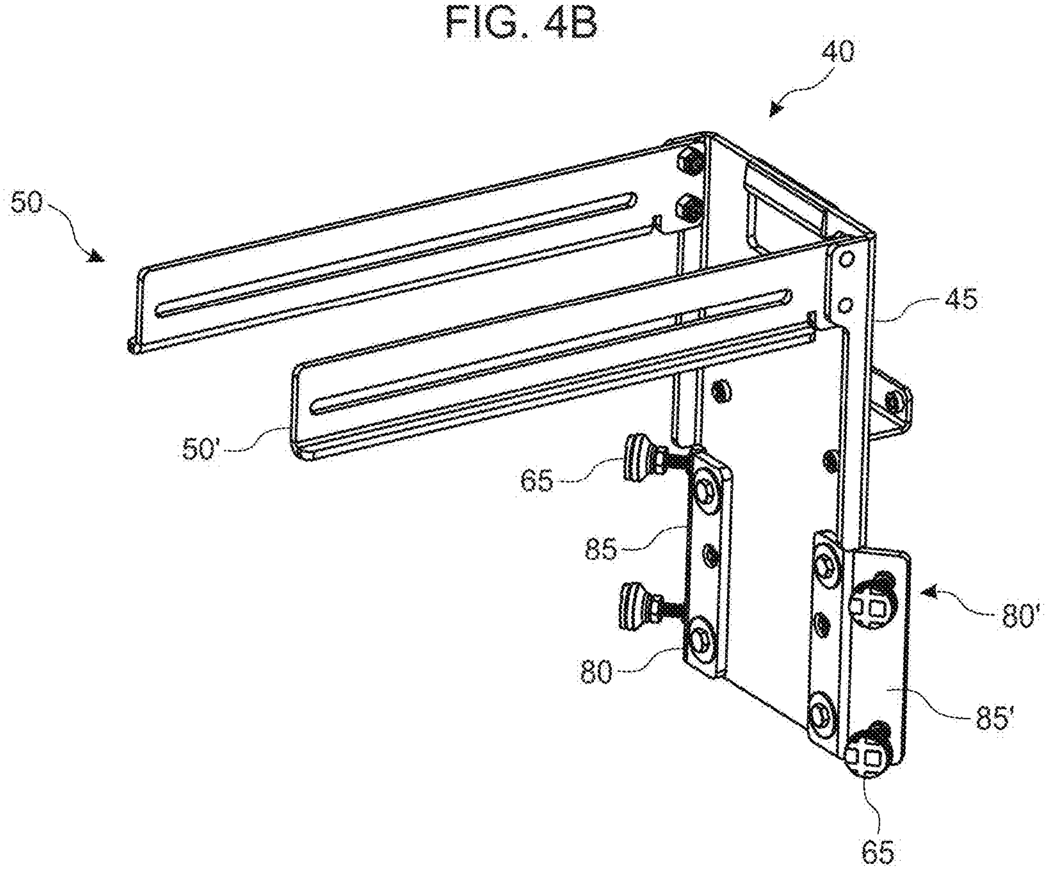
FIG. 4C illustrates the second subassembly of FIG. 4A showing complementary opposing interior corner attachments each comprising complementary opposing interior corner attachment faces and the compression means and illustrating the opposing second bracket arms inwardly depending from the second mounting plate.

With respect to FIG. 4A, FIG. 4B and FIG. 4C, assembly 1 is illustrated in a second embodiment configured for mounting on a corner portion of parapet 5 as depicted in FIG. 2.

The embodiment of FIG. 4A, FIG. 4B and FIG. 4C comprises a first subassembly 20 comprising a first mounting plate 25. In this alternative embodiment, a pair of angled standoff elements 70 and 70' are provided and comprise complementary opposing angled standoff surfaces 75 and 75' to permit a substantially planar surface engagement with a pair of complementary respective exterior corner surfaces 5' of parapet 5.

First subassembly 20 further comprises a pair of inwardly depending and opposing first bracket arms 35 and 35'. First bracket arms 35 and 35' extend approximately perpendicular to the interior major surface of first subassembly 20.

As in the above first embodiment, the inwardly projecting angle of first bracket arms 35 and 35' need not be a fixed 90-degree angle relative to first mounting plate 25 and may be configured to be varied or fixed about a user-defined axis with respect to the vertical plane defined by the major surface of first mounting plate 25 by means of a repositionable, rotatable, hinged or adjustable connection to first mounting plate 25.

Assembly 1 further comprises second subassembly 40. Second subassembly 40 comprises a second mounting plate 45 and a pair of inwardly depending and opposing second bracket arms 50 and 50'. Second bracket arms 50 and 50' extend approximately perpendicular to the interior major surface of second subassembly 40.

Also as in the above first embodiment, the inwardly projecting angle of second bracket arms 50 and 50' with respect to second subassembly 40 need not be a fixed 90-degree angle relative to second mounting plate 45 and may be configured to be varied about a user-defined axis with respect to the vertical plane defined by the major surface of second mounting plate 45 by means of a repositionable, rotatable, hinged or adjustable connection to second mounting plate 45.

First bracket arms 35 and 35' are configured to be adjustably longitudinally received along the length of respective second bracket arms 50 and 50' whereby the distance between the first mounting plate 25 and second mounting plate 45 may be selectively varied along the longitudinal axis of mounting assembly 1.

Assembly 1 further comprises locking means 55 to permit a user to selectively urge or compress first bracket arms 35 and 35' against the respective second bracket arms 50 and 50' along their respective lengths to define a substantially rigid connection between first subassembly 20 and second subassembly 40 when clamped over a parapet surface.

Suitable locking means 55 may comprise the illustrated one or more spaced-apart threaded apertures for the receiving of a threaded locking shaft in either or both of first backet arms 35 and 35' and second bracket arms 50 and 50' whereby the tightening of such shaft compresses first bracket arms 35 and 35' longitudinally along the respective lengths second bracket arms 50 and 50'.

Second subassembly 40 of the illustrated embodiment of FIG. 4A, FIG. 4B and FIG. 4C, comprises second mounting plate 45 and a pair of opposing outwardly depending interior corner attachments 80 and 80'. Interior corner attachments 80 and 80' each comprise respective complementary opposing angled interior corner attachment faces 85 and 85'.

Interior corner attachment faces 85 and 85' are configured to be respectively received substantially adjacent to and coplanar with the complementary angled interior surfaces of a corner of parapet 5.

In similar manner as that of the above first embodiment of assembly 1, angled standoff elements 70 and 70' comprise compression means 65 configured to selectively urge or compress second mounting plate 45 toward first mounting plate 25 when mounted on parapet 5. This in turn permits a user to tighten compression means 65 to generate a clamping force between assembly 1 and complementary angled interior surface of a corner of parapet 5 by selectively tightening compression means 65.

Angled standoff elements 70 and 70' and compression means 65 are configured to permit an adjustable offset of the major surface of first mounting plate 25 and the major surface of second mounting plate 45 a user-defined distance from each complementary wall surface 5' to define the channel volume 60 of FIG. 3A.

The channel volume 60 defined by standoff elements 70 and 70', compression means 65 and the first bracket arms 35 and 35 and second bracket arms 50 and 50' is desirable in that it defines a volume or "tunnel" having a volume that is selectable by a user for a given application through which a portion of the upper surface of parapet 5 is received without any contact by any element of assembly 1.

Because it is common for parapets to have an upper flashing or coping that projects outwardly from the vertical surfaces 5' as seen in FIG. 1 and FIG. 2, such a channel volume 60 is desirable to avoid physical contact or damage to the parapet flashing or coping.

To accommodate the need to install assembly 1 of any embodiment on parapets having different dimensions, standoff elements 70 and 70', compression means 65, first bracket arms 35 and 35 and second bracket arms 50 and 50' are all modular and each readily replaceable, customizable and interchangeable by a user on the respective first subassembly 20 and second subassembly 40 such as by means of threaded fasteners to enable in a modular customizable channel volume system wherein each such element may be provided with any user-defined configuration, dimension or geometry as is suited for a particular installation.

In a yet further embodiment, one or more leveling means such as a bubble level may be provided at one or more user-defined locations to assist in the efficient and accurate installation of assembly 1 on a structure.

Many alterations and modifications may be made by those having ordinary skill in the art without departing from the spirit and scope of the invention. Therefore, it must be understood that the illustrated embodiment has been set forth only for the purposes of example and that it should not be taken as limiting the invention as defined by any claims in any subsequent application claiming priority to this application.

For example, notwithstanding the fact that the elements of such a claim may be set forth in a certain combination, it must be expressly understood that the invention includes other combinations of fewer, more, or different elements, which are disclosed above, even when not initially claimed in such combinations.

The words used in this specification to describe the invention and its various embodiments are to be understood not only in the sense of their commonly defined meanings, but to include by special definition in this specification structure, material or acts beyond the scope of the commonly defined meanings. Thus, if an element can be understood in the context of this specification as including more than one meaning, then its use in a subsequent claim must be understood as being generic to all possible meanings supported by the specification and by the word itself.

The definitions of the words or elements of any claims in any subsequent application claiming priority to this application should be, therefore, defined to include not only the combination of elements which are literally set forth, but all equivalent structure, material or acts for performing substantially the same function in substantially the same way to obtain substantially the same result. In this sense, it is therefore contemplated that an equivalent substitution of two or more elements may be made for any one of the elements in such claims below or that a single element may be substituted for two or more elements in such a claim.

Although elements may be described above as acting in certain combinations and even subsequently claimed as such, it is to be expressly understood that one or more elements from a claimed combination can in some cases be excised from the combination and that such claimed combination may be directed to a sub-combination or variation of a sub-combination.

Insubstantial changes from any subsequently claimed subject matter as viewed by a person with ordinary skill in the art, now known or later devised, are expressly contemplated as being equivalently within the scope of such claims. Therefore, obvious substitutions now or later known to one with ordinary skill in the art are defined to be within the scope of the defined elements.

Any claims in any subsequent application claiming priority to this application are thus to be understood to include what is specifically illustrated and described above, what is conceptually equivalent, what can be obviously substituted and also what essentially incorporates the essential idea of the invention.

What is claimed:

1. A modular mounting assembly for compressibly mounting on a linear portion of a structure comprising:

a first subassembly comprising a first mounting plate, a pair of inwardly depending and opposing standoff elements and a first pair of fixed, non-pivotable and non-rotatable inwardly depending and opposing first bracket arms;

a second subassembly comprising a second mounting plate, a second pair of fixed, non-pivotable and non-rotatable inwardly depending and opposing second bracket arms and adjustable compression means;

the first bracket arms configured to be adjustably telescopically received by the respective second bracket arms whereby a distance between the first mounting plate and second mounting plate may be varied solely by linear translation along the longitudinal axis of the modular mounting assembly;

locking means to selectively urge or compress the first bracket arms against the respective second bracket arms to define a substantially rigid connection between the first subassembly and the second subassembly;

the standoff elements and compression means configured to define a channel volume;

the first mounting plate and the second mounting plate configured to adjustably receive and compressively capture at least two opposed lateral wall surfaces therebetween and within the channel volume.

2. The modular mounting assembly of claim 1 wherein at least one of the respective pairs of first bracket arms and second bracket arms comprises a user-defined length.

3. The modular mounting assembly of claim 1 wherein an inwardly depending angle of at least one of the respective pairs of first bracket arms and second bracket arms is a fixed user-defined angle.

4. The modular mounting assembly of claim 1 wherein at least one of the respective standoff elements is a user-defined configuration or geometry.

5. The modular mounting assembly of claim 1 wherein at least one of the compression means is a swivel leveling mount element.

6. A modular mounting assembly for compressibly mounting on a corner of a structure comprising:

a first subassembly comprising a first mounting plate, a first pair of fixed, non-pivotable and non-rotatable inwardly depending and opposing angled standoff elements and a pair of inwardly depending and opposing first bracket arms;

the angled standoff elements comprising respective angled standoff surfaces;

a second subassembly comprising a second mounting plate, a second pair of fixed, non-pivotable and non-rotatable inwardly depending and opposing second bracket arms and a pair of opposing interior corner attachments;

the interior corner attachments each comprising a respective interior corner attachment face and an adjustable compression means;

the first bracket arms configured to be adjustably telescopically received by the respective second bracket arms whereby a distance between the first mounting plate and second mounting plate may be varied solely by linear translation along the longitudinal axis of the modular mounting assembly;

locking means to selectively urge or compress the first bracket arms against the respective second bracket arms to define a substantially rigid connection between the first subassembly and the second subassembly;

the angled standoff elements and compression means configured to define a channel volume;

the first mounting plate and the second mounting plate configured to adjustably receive and compressively capture two angularly disposed and adjacent corner portions of a wall or structure comprising a pair of opposed lateral wall surfaces therebetween and within the channel volume.

7. The modular mounting assembly of claim 6 wherein at least one of the respective pairs of first bracket arms and second bracket arms comprises a user-defined length.

8. The modular mounting assembly of claim 6 wherein an inwardly depending angle of at least one of the respective pairs of first bracket arms and second bracket arms is a fixed user-defined angle.

9. The modular mounting assembly of claim 4 wherein at least one of the respective angled standoff elements is a user-defined configuration or geometry.

10. The modular mounting assembly of claim 4 wherein at least one of the compression means is a swivel leveling mount element.

* * * * *